April 15, 1969     J. C. JELLIS, JR     3,438,184

PICK-UP APPARATUS

Filed June 21, 1966

INVENTOR.
JAMES C. JELLIS, JR.
BY Braddock & Burd
ATTORNEYS

April 15, 1969     J. C. JELLIS, JR     3,438,184
PICK-UP APPARATUS

INVENTOR.
JAMES C. JELLIS, JR.
BY Braddock & Bund
ATTORNEYS

United States Patent Office 3,438,184
Patented Apr. 15, 1969

3,438,184
PICK-UP APPARATUS
James C. Jellis, Jr., Watertown, S. Dak., assignor to Modern-Way, Inc., Watertown, S. Dak., a corporation of South Dakota
Filed June 21, 1966, Ser. No. 559,303
Int. Cl. A01d 45/02, 45/10, 65/02
U.S. Cl. 56—119                    10 Claims

ABSTRACT OF THE DISCLOSURE

A crop pick-up attachment releasably secured to the nose structure of a row crop harvester. The pick-up attachment has a ground engaging wheel which drives a pick-up wheel having outwardly directed fingers. Guide members located adjacent the pick-up wheel function to strip the crop from the fingers and direct the crop onto the nose structure of the harvester.

---

This invention relates to an apparatus for gathering and elevating crops onto the gathering mechanism of a row crop harvesting machine as a mechanical corn picker, corn binder, corn picker and sheller, combine, sugar cane harvester and like machines usable to harvest standing row crops, as corn, sugar cane, sorghum, soybeans and the like. More particularly the invention relates to a pick-up unit which is readily attachable to the nose portion of a row crop harvesting machine and operable to pick up from the ground any fallen or downed crops, gather these crops inwardly toward the row and raise the crops upwardly and rearwardly onto the gathering mechanism of the harvesting machine.

Briefly described, the pick-up apparatus of this invention is a self-contained unit which can be connected to and detachable from the nose of a harvesting machine with a minimum of time and labor. The pick-up unit has a frame adapted to be secured to the nose of the harvesting machine. Rotatably mounted on the frame is an upright ground engaging wheel which positions the nose above the ground and provides a drive for a pick-up wheel located forwardly of the ground engaging wheel. The ground engaging wheel enables the gathering structure of the harvesting machine as well as the forward section of the nose to be held at an elevation substantially above the ground or in a higher position than normal. This eliminates the collection of rocks and other undesirable foreign materials from entering the harvesting machine while at the same time achieves greater harvesting efficiency.

The pick-up wheel is pivotally mounted on the frame in alignment with the ground engaging wheel and is biased into frictional engagement with the outer peripheral surface of the ground engaging wheel. The ground engaging wheel rotates on forward movement of the harvesting machine driving the pick-up wheel in an opposite direction. Secured to opposite sides of the pick-up wheel are a plurality of radially projected yieldable fingers which move with the pick-up wheel to collect and carry crops upwardly and rearwardly onto the gathering mechanism of the harvesting machine. The fingers coact with material take-off and guide means mounted on the frame operable to strip the material from the moving fingers and guide the material rearwardly into the harvesting machine.

Figure 1:
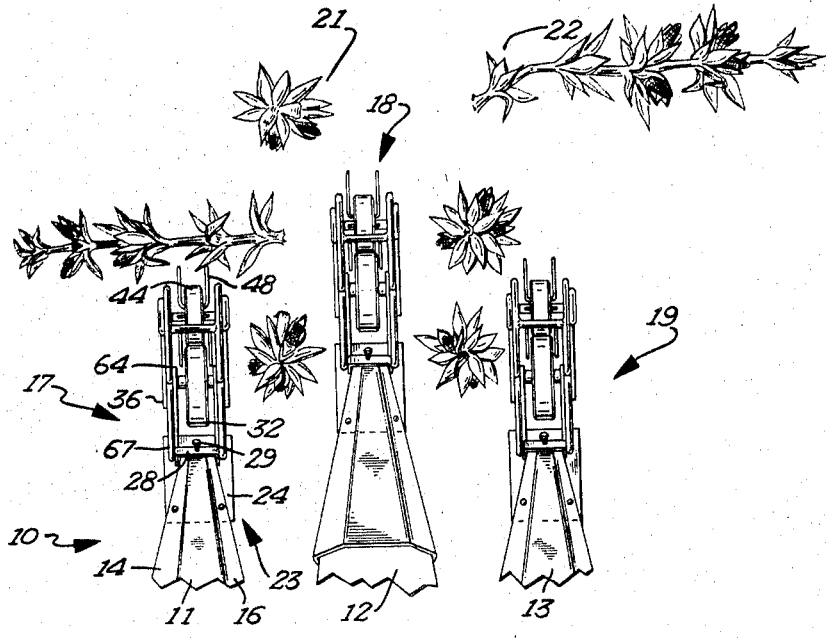
FIGURE 1 is a fragmentary plan view of the three noses of a gathering mechanism of a row crop harvesting machine equipped with the pick-up apparatuses of this invention mounted on the forward portion of each nose.

Referring to the drawings there is shown in FIGURE 1 a plan view of a gathering mechanism, indicated generally at 10, of a two row harvesting machine, as a corn picker. Gathering mechanism 10 has forwardly tapered nose sections 11, 12 and 13 which move longitudinally between rows of crops 21 and 22 to guide and carry the crops into the picking rollers (not shown) of the machine. Each nose section has downwardly inclined sides 14 and 16 which function as divider members for guiding the crops upwardly and laterally into their respective rows.

The harvesting machine can be any machine such as a corn picker, corn binder, combined corn picker and sheller, combine, sugar cane harvester, cultivator and like machines used in growing and harvesting of row crops. The row crops include corn, sugar cane, soybeans, sorghum and other agricultural crops. The following description is limited to a corn picking machine equipped with the pick-up apparatus of the invention. This description is an example of one use of the pick-up apparatus since the pick-up apparatus can be used with other row crop machines and implements.

Secured to the forward portion of each nose section 11, 12 and 13 are pick-up units 17, 18 and 19 operable to gather and move fallen corn into the rows and elevate the corn upwardly and rearwardly onto the nose sections of the gathering mechanism thereby guiding the corn into the picking rollers. Pick-up units 17, 18 and 19 are identical self-contained units which are readily connectable to and detachable from the nose sections of the gathering mechanism. The pick-up units function as wheel guides or gauges for the nose sections holding the nose sections elevated substantially above the ground in a higher position than normal. This eliminates the collection of rocks or other undesirable foreign materials and yet at the same time gather and move crops into the rows 21 and 22 and harvest a great percentage of the corn.

The following description is limited to the details of pick-up unit 17 which is identical to the pick-up units 18 and 19. Unit 17 has a frame indicated generally at 23 comprising a flat plate 24 carrying forwardly projected upright arms 26 and 27. An inverted U-shaped member 28 extends transversely across the front of the plate and is secured to the rear ends of arms 26 and 27 thereby forming a rectangular pocket for the forward portion of the nose section of the gathering mechanism. A bolt 29 is threaded through the mid-portion of the member 28 cooperates with the top of the nose section of the gathering mechanism to clamp the pick-up unit to the nose section. Plate 24 has suitable holes for nut and bolt assemblies 31 used to secure the plate to the bottom frame of the nose section. The bolt 29 and nut and bolt assemblies 31 permit the entire unit to be readily attachable to and detached from the nose section of the gathering mechanism of the machine.

Positioned between the forward ends of the arms 26 and 27 is an upright ground engaging wheel 32 rotatably mounted on a transverse axle 33. The axle extends through suitable holes in the forward portion of arms 26 and 27. Axle 33 also secures forwardly extended arm extensions 34 and 36 to arms 26 and 27. Each arm extension 34 has an upright slot 37 for receiving an outwardly projected pin 38 secured to the arms so as to permit limited angular movement of the arm extensions relative to the arms.

Figure 4:
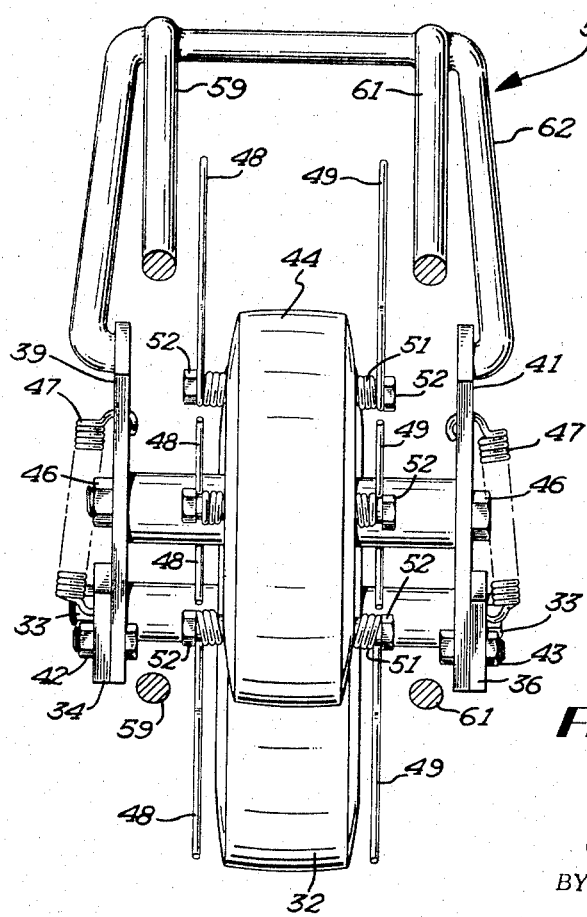
FIGURE 4 is an enlarged sectional view taken along the line 4—4 of FIGURE 3.

As shown in FIGURE 4, upright levers 39 and 41 are pivotally mounted to the forward portions of arm extensions 34 and 36 respectively by pivot members 42 and 43, as bolts, pins, rivets and the like. Located between levers 39 and 41 in the upright plane of the ground engaging wheel 32 is a pick-up wheel 44. A transverse axle 46 carried by the mid-sections of levers 39 and 41 rotatably mounts the pick-up wheel and permits the pick-up wheel to be held into frictional engagement with the outer peripheral surface of the ground engaging wheel 32. Pick-up wheel 44 is biased into engagement with ground engaging wheel 32 by a pair of springs 46 connected to the upper ends of the levers 39 and 41 and arm extensions 34 and 36 thereby providing a friction drive between the ground engaging wheel and the pick-up wheel whereby the pick-up wheel rotates in the opposite direction from the ground engaging wheel.

A plurality of pairs of yieldable fingers 48 and 49 are secured to the sides of pick-up wheel 44 and project in radial directions beyond the periphery of the pick-up wheel. The pairs of yieldable fingers 48 and 49 are circumferentially spaced from each other and may comprise two or three or four or more pairs of fingers.

Figures 2, 3:
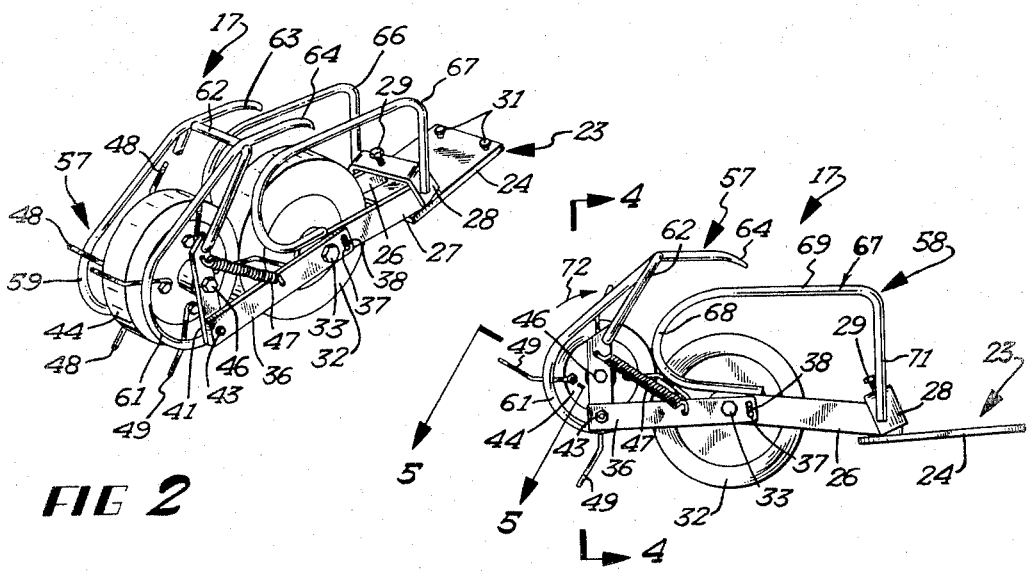
FIGURE 2 is a perspective view of one pick-up apparatus of the invention.
FIGURE 3 is a side view of the pick-up apparatus of FIGURE 2.
Figure 5:
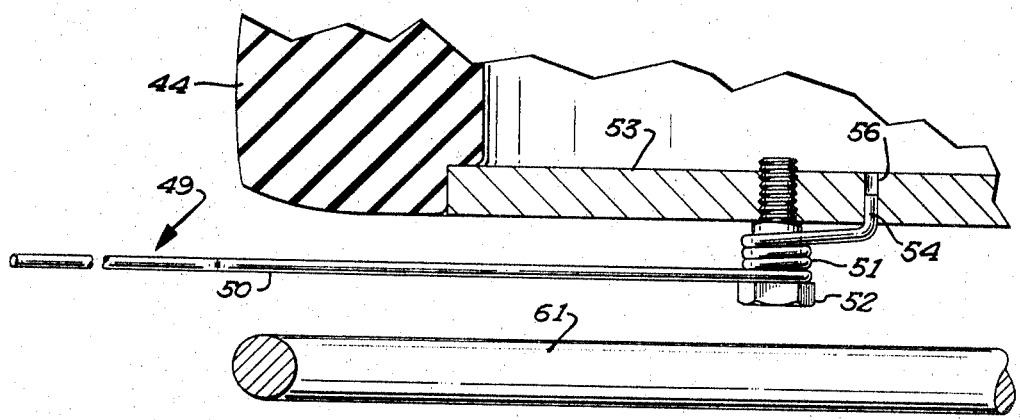
FIGURE 5 is an enlarged sectional view taken along the line 5—5 of FIGURE 3.

Yieldable fingers 48 and 49 are identical in construction and are mounted on the opposite sides of pick-up wheel 44. As shown in FIGURES 3 and 5, finger 49 has a forwardly bent outer end 50 so that when the finger is moved in the reverse direction the outer end will still be radial thereby eliminating the possibility of the crops from sliding over the finger. The inner end of the finger is formed into a coil spring 51 positioned about a bolt 52 threaded into the side 53 of the wheel. The inner end of spring 51 has a right angle projection 54 which fits into a hole 56 of the side 53 of the wheel thereby preventing the spring and finger from rotating about bolt 52 so as to hold the finger in a generally radial direction.

The crops are carried upwardly and rearwardly by the moving fingers over a stripper member indicated generally at 57 which removes the crops from the fingers and carries the crops rearwardly onto a guide member indicated generally at 58 which directs the material onto the nose section of the gathering mechanism.

As shown in FIGURE 2, stripper member 57 comprises a pair of arcuately curved rods 59 and 61 located on opposite sides of pick-up wheel 44 and extended upwardly and over an inverted U-shaped support 62. The lower ends of support 62 are secured to the top portions of the levers 39 and 41 respectively. Rods 59 and 61 project rearwardly from support 62 and terminate in downwardly curved rear projections 63 and 64 located above the forward end of guide member 58. The forward portions of rods 59 and 61 are arcuately curved and have a curvature generally equal to the curvature of the periphery of pick-up wheel 44. The curved sections of the rods are located in transverse alignment with the periphery of pick-up wheel 44 whereby fingers 48 and 49 project radially of the rods 59 and 61. As fingers 48 and 49 move with pick-up wheel 44 they carry the corn upwardly around the curved portions of rods 59 and 61 upwardly over inverted U-shaped support 62. The rear portions of rods 59 and 61 prevent the material from moving around with fingers 48 and 49 and deposit the material onto the guide member 58.

As shown in FIGURES 2 and 3, guide member 58 comprises a pair of curved rods 66 and 67 located in the upright planes of arms 26 and 27 adjacent opposite sides of ground engaging wheel 32. Rods 66 and 67 are identical in construction. As shown in FIGURE 3, rod 67 has a forwardly curved end 68 secured to the top of forward end of arm 26. Located above and extended substantially parallel to arm 26 is an elongated straight top 69 which terminates in a downwardly projected leg 71 secured to the side of inverted U-member 28. Rods 66 and 67 may be replaced with upright sheet members, as sheet metal, having the general outline of the rods whereby corn is carried rearwardly onto the gathering mechanism of the harvesting machine. In the like manner, stripper member 57 may be sheet members having upper peripheral edges which follow the contours and shapes of rods 59 and 61. Alternatively, stripper member 57 and guide member 58 may be a pair of upright sheet members located on opposite sides of wheels 32 and 44. Each sheet member has a curved front edge located adjacent the side of pick-up wheel 44 and a top edge extended rearwardly over the ground engaging wheel. The edges of the sheet members may be rounded or coiled to eliminate sharp edges which will cut the corn plants.

In use, each nose section 11, 12 and 13 is provided with a pick-up unit 17, 18 and 19. The pick-up units are raised and lowered with the gathering mechanism. The lower position of the gathering mechanism is determined by ground engaging wheels 32 which ride on the ground providing gauge wheels for nose sections 11, 12 and 13. On forward motion of the machine ground engaging wheels 32 rotate in a forward or first direction. Pick-up wheel 44 being in frictional engagement with the periphery of ground engaging wheel 32 rotates in a reverse or second direction moving the pairs of yieldable fingers 48 and 49 angularly about the axis of axle 46. The ends of the fingers are slightly above the ground because pick-up wheel 44 rotates about an axis which is above the axis of rotation of the ground engaging wheel 32 and the diameter of the pick-up wheel is slightly smaller than the diameter of the ground engaging wheel. As the pairs of fingers 48 and 49 move in the direction of arrow 72, shown in FIGURE 3, they collect and move the corn which is bent or broken upwardly into rows 21 and 22. The fingers move the corn along curved rods 59 and 61 toward guide member 58. As the corn moves upwardly and rearwardly on rods 59 and 61, it moves from the fingers onto rear projections 63 and 64 which direct the corn onto the guide member 58. The forward movement of the gathering mechanism moves the guide member relative to the corn with the guide member holding the corn at an elevated position. As the corn leaves the guide member it falls onto the inclined sides 14 or 16 of the nose sections and directed into the picking rollers of the machine.

The invention is defined in the following claims.

The embodiments of the invention in which an exclusive property or privilege is claimed are defined as follows:

1. Apparatus for placing crops onto the nose structure of a row crop machine comprising: ground engaging wheel means adapted to be rotatably connected to the nose structure, pick-up wheel means positioned adjacent of the ground engaging wheel means, means rotatably mounting the pick-up wheel means and drivably connecting the pick-up wheel means with the ground engaging wheel means whereby the pick-up wheel means rotates in a reverse direction relative to the ground engaging wheel means, said means mounting the pick-up wheel means comprising movable members positioning the pick-up wheel means in the same general plane of the ground engaging wheel means, means biasing the pick-up wheel means into engagement with the ground engaging wheel means, radially projected finger means fixedly mounted on opposite sides of said pick-up wheel means for rotation therewith to engage and elevate a crop lying on a ground surface, and guide means extended adjacent the pick-up wheel means and ground engaging wheel means for stripping crops carried by said finger from said finger and directing the crops onto the nose structure.

2. The apparatus of claim 1 including a frame, axle means rotatably mounting the ground engaging wheel means on the frame, and means for releasably attaching the frame to the nose structure.

3. The apparatus of claim 1 wherein a plurality of pairs of fingers are mounted on said pick-up wheel means, said fingers projecting radially of the pick-up wheel means.

4. The apparatus of claim 3 wherein said guide means include members located on opposite sides of the pick-up wheel means, said members having curved and linear edges which cooperate with the fingers to guide crops upwardly and rearwardly and move the crops from the fingers.

5. The apparatus of claim 4 wherein said curved edges generally follow the curvature of the pick-up wheel means.

6. The apparatus of claim 1 including a frame having a pair of forwardly projected arms, axle means rotatably mounting the ground engaging wheel means on the arms, means for releasably attaching the frame to the nose structure, said means mounting the pick-up wheel means comprising levers pivotally mounted on said arms, axle means rotatably mounting the pick-up wheel means on the levers for rotation about an axis generally parallel to the axis of rotation of the ground engaging wheel means, and means biasing the pick-up wheel means into engagement with the ground engaging wheel means.

7. The apparatus of claim 6 wherein said arms have forward arm extensions adjustable in an upright direction, said levers being pivotally mounted on said arm extensions.

8. The apparatus of claim 1 wherein radially projected fingers are mounted on opposite sides of the pick-up wheel means and said guide means includes a pair of curved rod members located on opposite sides of the pick-up wheel means adjacent the outsides of the fingers, said rod members cooperating with said fingers to move and guide crops upwardly and rearwardly toward the nose structure.

9. The apparatus of claim 1 including a frame, axle means rotatably mounting the ground engaging wheel means on the frame, means for releasably attaching the frame to the front of the nose structure, forwardly directed arms mounted on the frame on opposite sides of the ground engaging wheel means and means for rotatably mounting the pick-up wheel means on the arms forwardly of the ground engaging wheel means.

10. An apparatus for placing crops onto the nose structure of a row crop machine comprising: ground engaging resilient wheel means, frame means rotatably supporting the ground engaging wheel means and adapted to be releasably mounted on the front of the nose structure, pick-up resilient wheel means positioned in alignment with and forwardly of and in engagement with the ground engaging wheel means, arm means connected to the frame and rotatably mounting the pick-up wheel means and frictionally connecting the pick-up wheel means with the ground engaging wheel means whereby the pick-up wheel means rotates in a reverse direction relative to the ground engaging wheel means, radially projected finger means fixedly mounted on opposite sides of the pick-up wheel means for rotation therewith to engage and elevate a crop lying on a ground surface, and stationary guide means located adjacent the pick-up wheel means and the ground engaging wheels, means for stripping crops carried up by said finger and directing the crops onto the nose structure.

References Cited

UNITED STATES PATENTS

| | | | |
|---|---|---|---|
| 1,642,892 | 9/1927 | Powell | 56—15 |
| 122,630 | 1/1872 | Messinger | 56—317 |

HUGH R. CHAMBLEE, *Primary Examiner.*

U.S. Cl. X.R.

56—15, 317